United States Patent
Hayashi (10) Patent No.: US 12,334,968 B2
(45) Date of Patent: Jun. 17, 2025

(54) WIRELESS RECEPTION CIRCUIT

(71) Applicant: Socionext Inc., Kanagawa (JP)

(72) Inventor: Joji Hayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 478 days.

(21) Appl. No.: 18/055,645

(22) Filed: Nov. 15, 2022

(65) Prior Publication Data
US 2023/0079684 A1   Mar. 16, 2023

Related U.S. Application Data

(63) Continuation of application No. PCT/JP2020/021876, filed on Jun. 3, 2020.

(51) Int. Cl.
*H04B 1/04* (2006.01)
*H04B 1/16* (2006.01)
*H04B 17/318* (2015.01)

(52) U.S. Cl.
CPC ............ *H04B 1/16* (2013.01); *H04B 17/318* (2015.01)

(58) Field of Classification Search
CPC .......... H04B 1/06; H04B 1/16; H04B 1/1676; H04B 17/318
See application file for complete search history.

(56) References Cited

U.S. PATENT DOCUMENTS

| | | | |
|---|---|---|---|
| 7,203,472 B2* | 4/2007 | Seppinen | H04B 17/20 455/313 |
| 7,227,916 B2* | 6/2007 | Ruelke | H03G 3/001 375/345 |
| 9,001,942 B2* | 4/2015 | Solum | H04L 27/3809 375/345 |
| 2004/0161026 A1 | 8/2004 | Jensen et al. | |
| 2010/0022211 A1 | 1/2010 | Huang | |
| 2014/0015568 A1 | 1/2014 | Shimamune et al. | |

FOREIGN PATENT DOCUMENTS

| | | |
|---|---|---|
| JP | 2007-174553 A | 7/2007 |
| WO | 2013/031440 A1 | 3/2013 |

OTHER PUBLICATIONS

International Search Report (ISR) dated Aug. 25, 2020 issued in International Patent Application No. PCT/JP2020/021876, with English translation.
N.Sasho, et al., "Single-Chip 5.8GHz DSRC Transceiver with Dual-Mode of ASK and Pi/4-QPSK", 2008 IEEE Radio and Wireless Symposium, pp. 799-802, Jan. 2008.

* cited by examiner

*Primary Examiner* — Tuan Pham
(74) *Attorney, Agent, or Firm* — Rimon P.C.

(57) ABSTRACT

In a wireless reception circuit, an LNA amplifies an input signal, and a mixer mixes the output of the LNA with a local oscillation signal. The output of the mixer is filtered by a first filter circuit, and the signal strength is detected by a first signal strength detection circuit. The output of the mixer is also filtered by a second filter circuit via an attenuator, and the signal strength is detected by a second signal strength detection circuit. The signal strength detected by the first signal strength detection circuit and the signal strength detected by the second signal strength detection circuit are added up to obtain the signal strength of the input signal.

14 Claims, 8 Drawing Sheets

WIRELESS RECEPTION CIRCUIT

CROSS-REFERENCE TO RELATED APPLICATIONS

This is a continuation of International Application No. PCT/JP2020/021876 filed on Jun. 3, 2020. The entire disclosure of this application is incorporated by reference herein.

BACKGROUND

The present disclosure relates to a wireless reception circuit.

In wireless communication systems represented by dedicated short range communication (DSRC) systems such as an electronic toll collection (ETC) system, a digital modulation scheme such as amplitude shift keying (ASK) is used. A receiver of such a wireless system performs carrier sensing to check whether there is a partner to communicate with in the communication area. When receiving a signal from a communication partner in the communication area, the receiver detects a change in amplitude and demodulates the ASK signal using its inner demodulator, and starts communication if the demodulated signal has a predetermined pattern.

In a normal wireless communication system, signals of other channels in the same system and signals in other wireless systems are also present in its neighboring frequency bands. Such signals are unwanted signals for the signal intended to receive, and deteriorate the communication quality of the signal. It is therefore required to remove such unwanted signals using a filter, etc.

N. Sasho, et al., "Single-Chip 5.8 GHz DSRC Transceiver with Dual-Mode of ASK and Pi/4-QPSK," 2008 IEEE Radio and Wireless Symposium, pp. 799-802, January 2008 discloses a wireless reception circuit in which a wireless signal is received via an antenna, amplified by a low noise amplifier (LNA), and then converted to a low-frequency signal by a mixer, and after unwanted signals are removed by a filter, signal strength is detected. In this prior art, for removal of unwanted signals, a SAW filter (externally provided) is used to remove unwanted waves and then signal strength is detected. For detection of signal strength, a received signal strength indicator (RSSI) is used. The SAW filter is high in Q value, and one having a Q value of around 10, for example, is used for receivers.

However, since the SAW filter is expensive and large in size, it is difficult to achieve downsizing of the module and cost reduction. To solve this problem, it is proposed to provide a filter constituted by an active circuit in an LSI, in place of the SAW filter. An active circuit however has problems in linearity and noise characteristics, failing to realize a dynamic range required in securing reception performance. For example, when a filter is constituted by an active circuit, there occurs a problem that the filter is saturated when the input signal level becomes high. When the filter is saturated, the output signal of the RSSI is also saturated, failing to detect a change in signal level. This may cause a possibility of mistakenly demodulating the modulated signal. When the output signal of the RSSI is saturated, also, correct demodulation may not be obtained even in other digital modulation schemes.

In view of the above problems, an objective of the present disclosure is providing a wireless reception circuit in which filters are integrated in a semiconductor integrated circuit for downsizing and cost reduction, to permit detection of signal strength at high speed in a wide dynamic range.

SUMMARY

According to one mode of the present disclosure, a wireless reception circuit includes: a low noise amplifier circuit (LNA) that amplifies an input signal; a first mixer that receives an output of the low noise amplifier circuit, mixes the received signal with a first local oscillation signal, and outputs the mixed signal; a first filter circuit that filters the output of the first mixer; a first signal strength detection circuit that receives an output of the first filter circuit and detects signal strength; an attenuator that receives the output of the first mixer, attenuates the received signal, and outputs the attenuated signal; a second filter circuit that filters the output of the attenuator; and a second signal strength detection circuit that receives an output of the second filter circuit and detects signal strength, wherein the signal strength detected by the first signal strength detection circuit and the signal strength detected by the second signal strength detection circuit are added up to obtain signal strength of the input signal.

According to the above mode, there are provided the first signal strength detection circuit that detects signal strength based on the output of the first mixer and the second signal strength detection circuit that detects signal strength based on the attenuated signal obtained by attenuating the output of the first mixer by the attenuator. By adding up the signal strength detected by the first signal strength detection circuit and the signal strength detected by the second signal strength detection circuit, the signal strength of the input signal is obtained. With this configuration, the second filter circuit can be operated without saturation even in a range where the first filter circuit is saturated, whereby the range within which a signal can be output linearly in response to the input signal can be widened. It is therefore possible to integrate filters in a semiconductor integrated circuit for downsizing and cost reduction and thereby detect signal strength at high speed in a wide dynamic range.

According to another mode of the present disclosure, a wireless reception circuit includes: a low noise amplifier circuit (LNA) that amplifies an input signal; a first mixer that receives an output of the low noise amplifier circuit, mixes the received signal with a local oscillation signal, and outputs the mixed signal; an amplifier circuit that receives the output of the first mixer, amplifies the received signal, and outputs the amplified signal; a first filter circuit that filters the output of the amplifier circuit; a first signal strength detection circuit that receives an output of the first filter circuit and detects signal strength; a second filter circuit that filters the output of the first mixer; and a second signal strength detection circuit that receives an output of the second filter circuit and detects signal strength, wherein the signal strength detected by the first signal strength detection circuit and the signal strength detected by the second signal strength detection circuit are added up to obtain signal strength of the input signal.

According to the above mode, there are provided the first signal strength detection circuit that detects signal strength based on the amplified signal obtained by amplifying the output of the first mixer by the amplifier and the second signal strength detection circuit that detects signal strength based on the output of the first mixer. By adding up the signal strength detected by the first signal strength detection circuit and the signal strength detected by the second signal strength detection circuit, the signal strength of the input signal is obtained. With this configuration, the second filter circuit can be operated without saturation even in a range where the first filter circuit is saturated, whereby the range within which a signal can be output linearly in response to the input signal can be widened. It is therefore possible to integrate filters in a semiconductor integrated circuit for downsizing and cost reduction and thereby detect signal strength at high speed in a wide dynamic range.

In the wireless reception circuit according to the present disclosure, It is possible to integrate filters in a semiconductor integrated circuit for downsizing and cost reduction and thereby detect signal strength at high speed in a wide dynamic range.

DETAILED DESCRIPTION

An embodiment of the present disclosure will be described hereinafter with reference to the accompanying drawings. Note that the specific numeric values presented in the following embodiment are mere illustrations for easy understanding of the invention and by no means intended to limit the scope of the invention.

Figure 1:
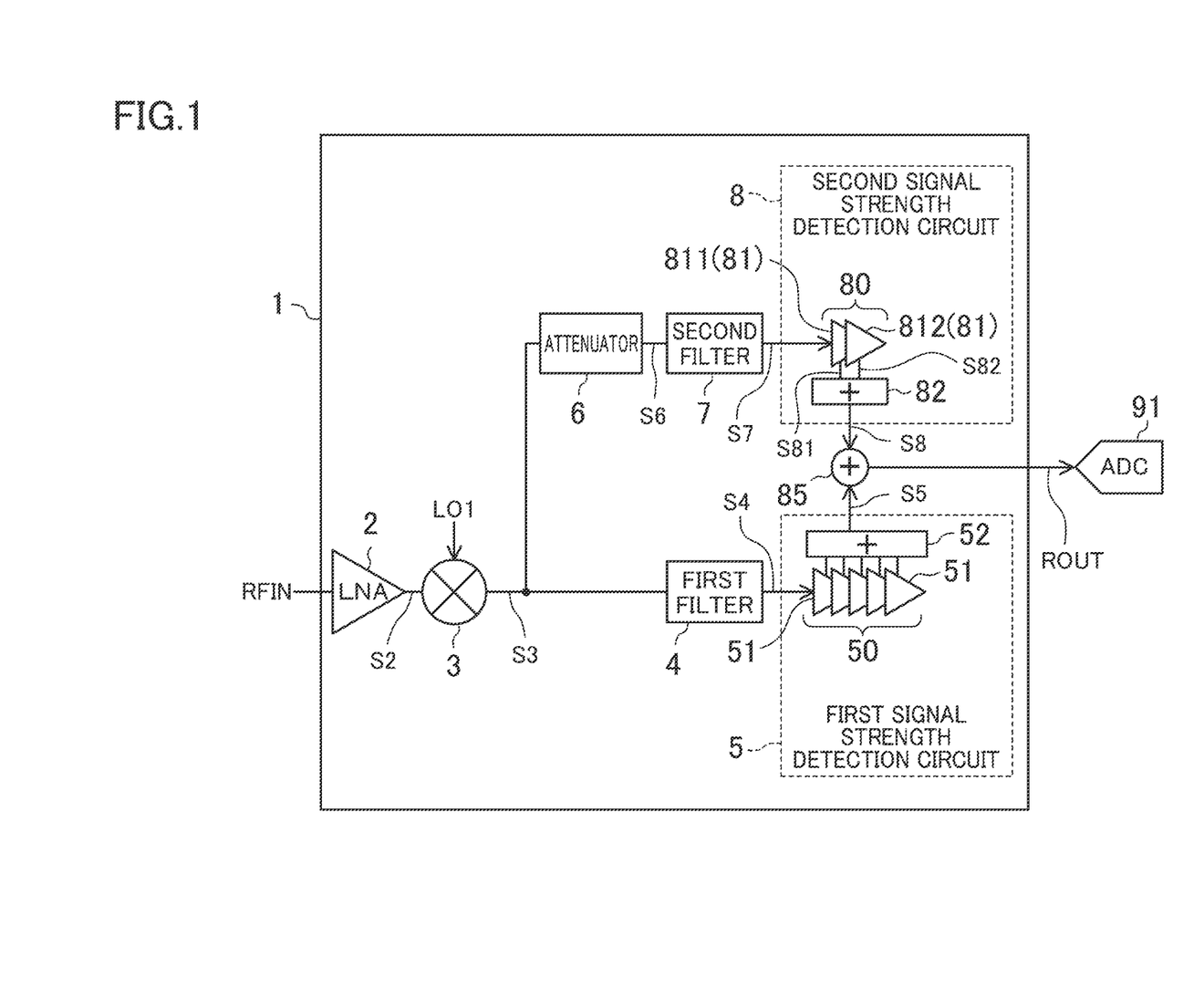
FIG. 1 is a block diagram showing a configuration of a wireless reception circuit of an embodiment.

FIG. 1 is a block diagram showing a configuration example of a wireless reception circuit 1 of this embodiment.

The wireless reception circuit 1 of this embodiment is incorporated in a receiver (not shown) of a wireless communication system represented by a DSRC system such as an ETC system. The receiver performs carrier sensing to search for another apparatus (hereinafter referred to as a communication partner) present within the communication area of the receiver. When receiving a signal from a communication partner within the communication area, the receiver detects a change in amplitude and demodulates the ASK signal by the wireless reception circuit 1, and starts communication with the communication partner if the demodulated signal has a predetermined pattern. Note that the target to which the wireless reception circuit 1 of this embodiment is applied is not limited to the ETC system. For example, the wireless reception circuit 1 can be widely applied to cases of detecting the signal level of a received signal to perform AGC control and to wireless systems of demodulating ASK modulated signals.

As shown in FIG. 1, the wireless reception circuit 1 includes a low-noise amplifier circuit 2 (hereinafter abbreviated as an LNA 2), a mixer 3 (corresponding to the first mixer), a first filter circuit 4, a first signal strength detection circuit 5, an attenuator 6, a second filter circuit 7, a second signal strength detection circuit 8, and an adder circuit 85.

The LNA 2 amplifies a radio-frequency signal RFIN received via an antenna (not shown) at low noise and outputs the resultant signal as an amplified signal S2. The radio-frequency signal RFIN is a signal in a GHz band, for example. When the wireless reception circuit 1 of this embodiment is applied to an ETC system, the frequency of the radio-frequency signal RFIN is 5795 [MHz], and the frequency of a local oscillation signal LO1 to be described later is 5835 [MHz], for example. Also, the radio-frequency signal RFIN received by the ETC system has a signal level of −20 [dBm] to −80 [dBm]. Note however that the frequency and signal level of the radio-frequency signal RFIN received by the wireless reception circuit 1 and the frequency of the local oscillation signal LO1 input into the mixer 3 are not limited to those specified above.

The mixer 3 receives the amplified signal S2 output from the LNA 2, mixes the amplified signal S2 with the local oscillation signal LO1, and outputs an IF signal S3 related to the frequency difference between these signals. The frequency of the IF signal S3 is the frequency difference between the radio-frequency signal RFIN and the local oscillation signal LO1, for example. In the ETC system, the frequency of the IF signal S3 is 40 [MHz], and the total of the gains of the LNA 2 and the mixer 3 is 30 [dB], for example.

Figure 2:
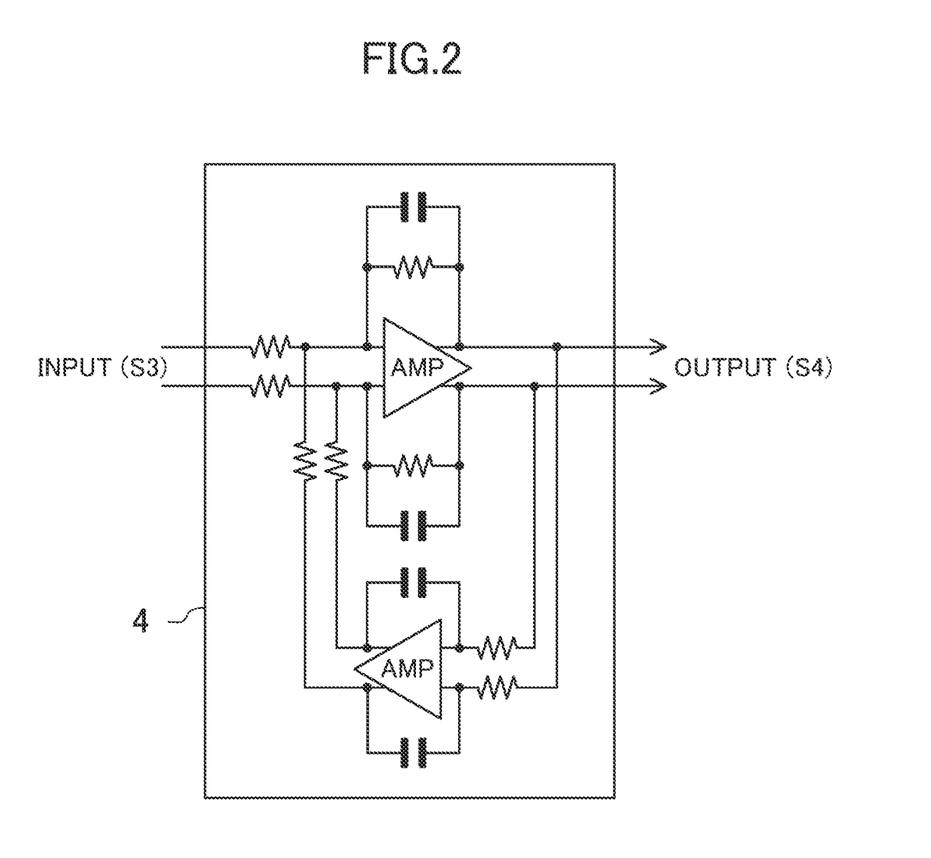
FIG. 2 is a circuit diagram showing a configuration example of a filter circuit.

The first filter circuit 4 receives the IF signal S3 output from the mixer 3, filters the signal, and outputs the resultant signal to the first signal strength detection circuit 5 as a first filter signal S4. FIG. 2 shows a biquad band-pass filter in which operational amplifiers and RC elements are combined, as an example of the first filter circuit 4. In the first filter circuit 4, the center frequency is set at 40 [MHz] corresponding to the frequency of the IF signal S3, and the signal frequency band is set at 4 [MHz], for example. The first filter circuit 4 has a characteristic of being saturated when the radio-frequency signal RFIN is −40 [dBm], for example. When the total of the gains of the LNA2 and the mixer 3 is 30 [dB] as described above, the first filter circuit 4 alone will be saturated at −10 [dBm]. Note that, although not shown, the first filter circuit 4 may be made of multistage band-pass filters depending on the attenuation amount required for filtering. Also, the first filter circuit 4 may be a multiple feedback filter, or a combination of a low-pass filter and a high-pass filter. When the frequency of the radio-frequency signal RFIN and that of the local oscillation signal LO1 are the same (a direct conversion reception scheme), the first filter circuit 4 may be constituted by a low-pass filter.

Figure 3:
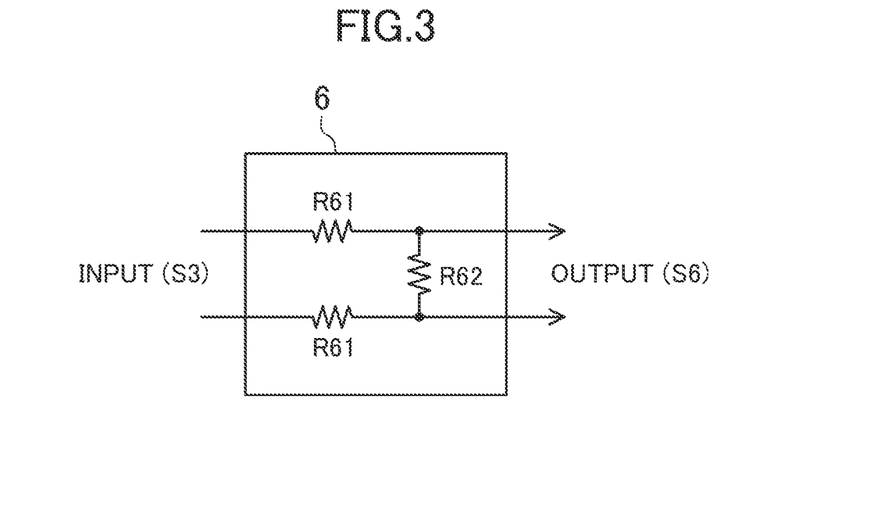
FIG. 3 is a circuit diagram showing a configuration example of an attenuator.

The attenuator 6 receives the IF signal S3 output from the mixer 3, attenuates the signal level, and outputs the resultant signal as an attenuated signal S6. FIG. 3 shows a circuit configuration example of the attenuator 6 of which the attenuation amount is determined according to the resistance ratio. In the case of the circuit of FIG. 3, the attenuation amount A is expressed by:

$$A = -20 \times \log(R62/(2 \times R61 + R62)) \quad (1)$$

where R61 is the resistance value of a resistance R61 in FIGS. 3 and R62 is the resistance value of a resistance R62 in FIG. 3. Assuming that R61=9 [kΩ] and R62=2 [kΩ], the attenuation amount A of the circuit of FIG. 3 will be A=20 [dB].

Figure 4:
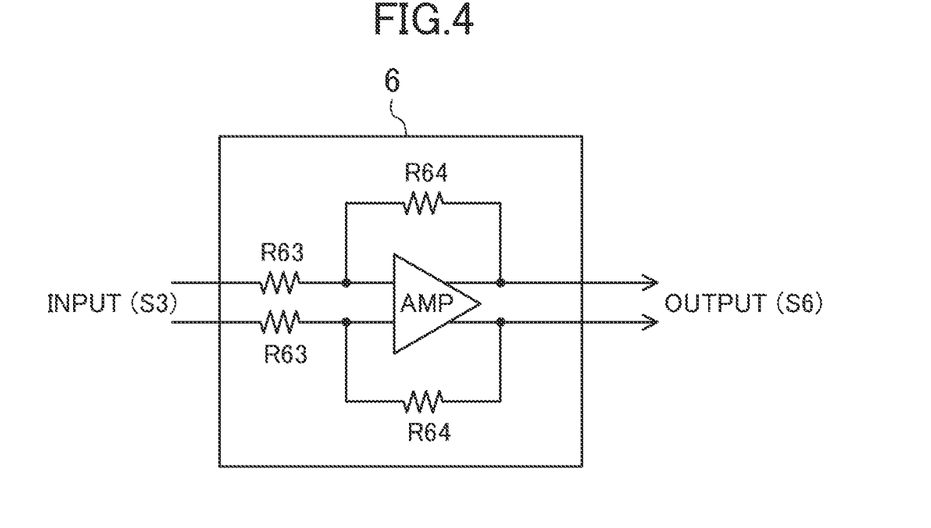
FIG. 4 is a circuit diagram showing another configuration example of the attenuator.

The attenuator 6 is not limited to the configuration of FIG. 3, but may have another configuration. For example, FIG. 4 shows a configuration example of the attenuator 6 using an operational amplifier. In the case of the circuit of FIG. 4, the attenuation amount A is expressed by:

$$A = -20 \times \log(R64/R63) \quad (2)$$

where R63 is the resistance value of a resistance R63 in FIGS. 4 and R64 is the resistance value of a resistance R64 in FIG. 4. Assuming that R63=50 [kΩ] and R64=5 [kΩ], the attenuation amount A of the circuit of FIG. 4 will be A=20 [dB].

The second filter circuit 7 receives the attenuated signal S6 output from the attenuator 6, filters the attenuated signal S6, and outputs the resultant signal to the second signal strength detection circuit 8 as a second filter signal S7. Since a common circuit can be used for the first filter circuit 4 and the second filter circuit 7, description on the configuration of the second filter circuit 7 is omitted here. To the second filter circuit 7, the IF signal S3 output from the mixer 3 is input after being attenuated by the attenuator 6 by 20 [dB]. Therefore, even when the second filter circuit 7 alone has a characteristic of being saturated at −10 [dBm], as does the first filter circuit 4, it is not saturated until the radio-frequency signal RFIN is −20 [dBm].

Figure 5:
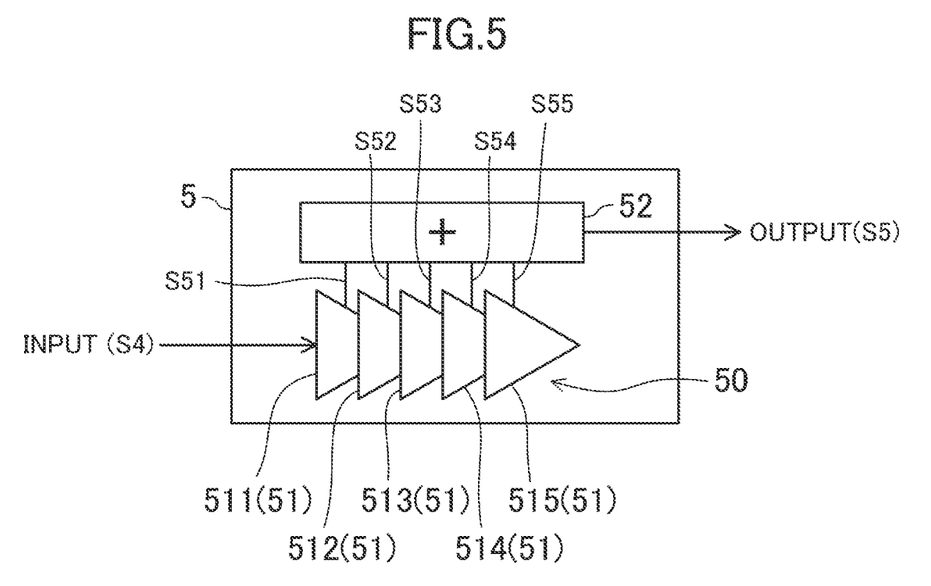
FIG. 5 is a block diagram showing a configuration example of a signal strength detection circuit.

As shown in FIG. 5, the first signal strength detection circuit 5 includes a first limiting amplifier group 50 constituted by multistage-connected first limiting amplifiers 51 and a first adder 52 (corresponding to the first detection circuit). In this embodiment, as an example, the first limiting amplifier group 50 has five-stage first limiting amplifiers 51. Note that, in the following description, when the five-stage first limiting amplifiers 51 are referred to separately from one another, they may be individually denoted by 511 to 515 in the order of the first-stage one receiving the first filter signal S4 to the fifth-stage one.

Figure 6:
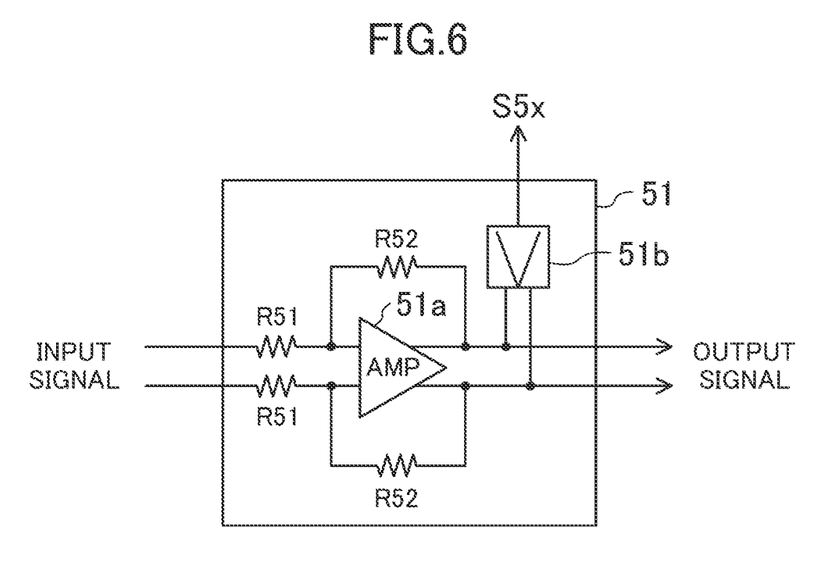
FIG. 6 is a circuit diagram showing a configuration example of a limiting amplifier.

FIG. 6 shows an example of the first limiting amplifier 51 constituted using a differential operational amplifier 51a (corresponding to the first amplifier circuit). In the configuration of FIG. 6, the gain of the first limiting amplifier 51 is determined by the ratio between input resistances and output resistances connected to the operational amplifier 51a. For example, in the circuit of FIG. 6, assuming that the resistance value of the input resistances R51 is 10 [kΩ] and the resistance value of the output resistances R52 is 32 [kΩ], the gain of the first limiting amplifier 51 per stage will be 10 [dB]. In each of the first limiting amplifiers 51, amplitude information is taken out from the output of the operational amplifier 51a by a rectifier 51b (corresponding to the first converter) and output to the first adder 52. That is, the rectifier 51b outputs a current signal corresponding to the amplitude of the output signal of the operational amplifier 51a. The first adder 52 adds up first current signals S5x (x is an integer of 1 to 5 in this embodiment) received from the rectifiers 51b of the five-stage first limiting amplifiers 51, and outputs the resultant signal as a first current signal S5. Note that the first limiting amplifiers 51 are not limited to the differential type, but may have a single-ended configuration.

Referring back to FIG. 1, the second signal strength detection circuit 8 includes a second limiting amplifier group 80 constituted by multistage-connected second limiting amplifiers 81 and a second adder 82 (corresponding to the second detection circuit). In this embodiment, as an example, the second limiting amplifier group 80 has two-stage second limiting amplifiers 81. Note that, in the following description, when the two-stage second limiting amplifiers 81 are referred to separately from each other, the first-stage one receiving the second filter signal S7 may be denoted by 811 and the second-stage one by 812. A common configuration can be used for the first limiting amplifiers 51 and the second limiting amplifiers 81. That is, in FIG. 6, the operational amplifier 51a is an example of the second amplifier circuit of the second limiting amplifier 81, and the rectifier 51b is an example of the second converter of the second limiting amplifier 81. For example, the configuration of FIG. 6 can be considered as the configuration of the second limiting amplifier 81, in which the gain of the second limiting amplifier 81 per stage will be 10 [dB]. The second adder 82 adds up second current signals S81 and S82 received from the rectifiers (corresponding to the second converters) of the two-stage second limiting amplifiers 81, and outputs the resultant signal as a second current signal S8. Note that the second limiting amplifiers 81 also may have a single-ended configuration.

The adder circuit 85 adds up the first current signal S5 and the second current signal S8, converts the added signal to a voltage signal, and outputs the resultant signal to an ADC 91 at the subsequent stage as an RSSI output signal ROUT. The ADC 91 converts the RSSI output signal ROUT to a digital signal.

With the configuration described above, the wireless reception circuit 1 of FIG. 1 can obtain a linearly-changing output, as the RSSI output signal ROUT, for the signal level of the radio-frequency signal RFIN in the range of −90 [dBm] to −20 [dBm].

Operation Example of Wireless Reception Circuit

The operation of the wireless reception circuit 1 in the case where a signal having a signal level of −90 [dBm] to −20 [dBm] is input as the radio-frequency signal RFIN will be described hereinafter. Assume here that the gain of each of the first limiting amplifiers 51 (511 to 515) and the second limiting amplifiers 81 (811 and 812) is 10 [dB]. Assume also that the first filter circuit 4 is saturated when the input signal (IF signal S3) is −10 [dBm]. Likewise, assume that the second filter circuit 7 is saturated when the input signal (attenuated signal S6) is −10 [dBm], and the first limiting amplifiers 51 and the second limiting amplifiers 81 are saturated when the output level is 0 [dBm].

—Zone (i)—

Figure 7:
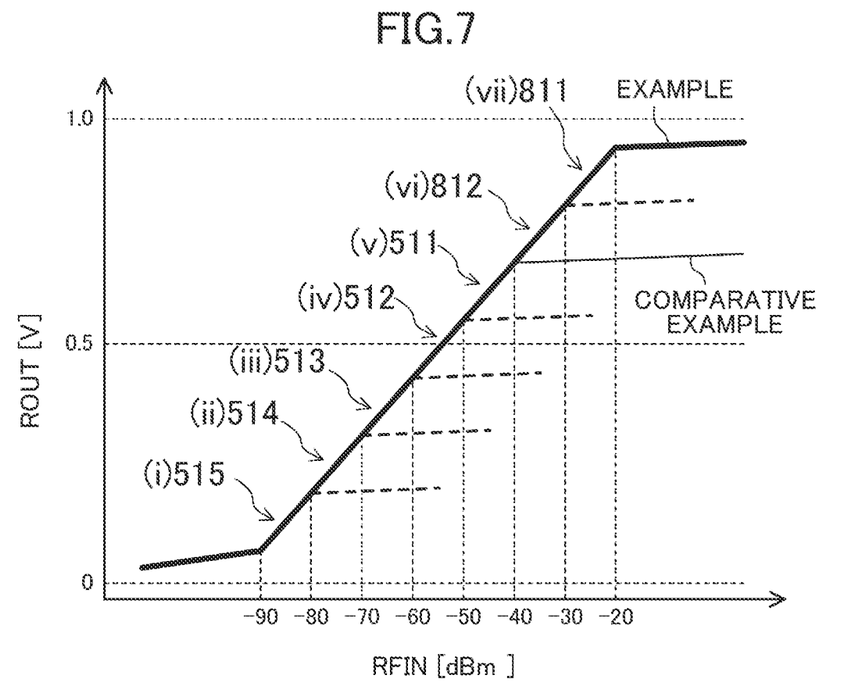
FIG. 7 is a view showing an example of the input/output characteristics of the wireless reception circuit.

In zone (i) in FIG. 7, the radio-frequency signal RFIN changes in the range of −90 [dBm] to −80 [dBm]. At this time, the output of the fifth-stage first limiting amplifier 515 linearly changes with increase of the radio-frequency signal RFIN, and the result is reflected in the RSSI output signal ROUT. To state specifically, when the radio-frequency signal RFIN is −90 [dBm] to −80 [dBm], the signal level of the IF signal S3 after the passing through the LNA 2 and the mixer 3 is −60 [dBm] to −50 [dBm]. The first-stage first limiting amplifier 511 then receives the first filter signal S4 having a signal level of −60 [dBm] to −50 [dBm], and outputs a signal having a signal level of −50 [dBm] to −40 [dBm]. The second-stage first limiting amplifier 512 receives the output signal of the first-stage first limiting amplifier 511, and outputs a signal having a signal level of −40 [dBm] to −30 [dBm]. The third-stage first limiting amplifier 513 receives the output signal of the second-stage first limiting amplifier 512, and outputs a signal having a signal level of −30 [dBm] to −20 [dBm]. The fourth-stage first limiting amplifier 514 receives the output signal of the third-stage first limiting amplifier 513, and outputs a signal having a signal level of −20 [dBm] to −10 [dBm]. The fifth-stage first limiting amplifier 515 receives the output signal of the fourth-stage first limiting amplifier 514, and outputs a signal having a signal level of −10 [dBm] to 0 [dBm]. Since the outputs of the first-stage to fourth-stage first limiting amplifiers 511 to 514 are small, the current signals S51 to S54 are also small, so that their influences on the RSSI output signal ROUT are negligible. In the second limiting amplifier group 80, where the IF signal S3 has been attenuated by the attenuator 6 by 20 [dB], since the outputs of the second limiting amplifiers 811 and 812 are small, the current signals S81 and S82 are also small, so that their influences on the RSSI output signal ROUT are negligible. The same holds true for zones (ii) to (v) to be described later. Therefore, as described above, the output of the fifth-stage first limiting amplifier 515 of the first signal strength detection circuit 5 linearly changes with increase of the radio-frequency signal RFIN, causing the current output S55 also to change linearly, and the result of this change is reflected in the RSSI output signal ROUT.

—Zone (ii)—

In zone (ii) in FIG. 7, the radio-frequency signal RFIN changes in the range of −80 [dBm] to −70 [dBm]. At this time, the output of the fourth-stage first limiting amplifier 514 linearly changes with increase of the radio-frequency signal RFIN, and the result is reflected in the RSSI output signal ROUT. Specifically, the input/output signals of the first-stage to fourth-stage first limiting amplifiers 511 to 514 rise by 10 [dB] from those described in zone (i) above. Since the fifth-stage first limiting amplifier 515 is saturated when the output level is 0 [dBm], the current signal S55 becomes constant (see the broken line extending from between (i) and (ii) in FIG. 7). Therefore, its output signal level is substantially unchanged from when the signal level of the radio-frequency signal RFIN was −80 [dBm]. Also, since the outputs of the first-stage to third-stage first limiting amplifiers 511 to 513 and the second limiting amplifiers 811 and 812 are small, the current signals S51 to S53 and the current signals S81 and S82 are also small, so that their influences on the RSSI output signal ROUT are negligible. Therefore, the total of the outputs of the fourth-stage and fifth-stage first limiting amplifiers 514 and 515 is reflected in the RSSI output signal ROUT. Also, the output of the fourth-stage first limiting amplifier 514 of the first signal strength detection circuit 5 linearly changes with increase of the radio-frequency signal RFIN, causing the current output S54 also to change linearly, and the result of this change is reflected in the RSSI output signal ROUT.

—Zone (iii)—

In zone (iii) in FIG. 7, the radio-frequency signal RFIN changes in the range of −70 [dBm] to −60 [dBm]. At this time, the output of the third-stage first limiting amplifier 513 linearly changes with increase of the radio-frequency signal RFIN, and the result is reflected in the RSSI output signal ROUT. Specifically, the input/output signals of the first-stage to third-stage first limiting amplifiers 511 to 513 rise by 10 [dB] from those described in zone (ii) above. Since the fourth-stage first limiting amplifier 514 is saturated when the output level is 0 [dBm], the current signal S54 becomes constant. Therefore, the output signal levels of the fourth-stage and fifth-stage first limiting amplifiers 514 and 515 are substantially unchanged from when the signal level of the radio-frequency signal RFIN was −70 [dBm] (see the broken line extending from between (ii) and (iii) in FIG. 7). Also, since the outputs of the first-stage and second-stage first limiting amplifiers 511 and 512 and the second limiting amplifiers 811 and 812 are small, the current signals S51 and S52 and the current signals S81 and S82 are also small, so that their influences on the RSSI output signal ROUT are negligible. Therefore, the total of the outputs of the third-stage to fifth-stage first limiting amplifiers 513 to 515 is reflected in the RSSI output signal ROUT. Also, the output of the third-stage first limiting amplifier 513 of the first signal strength detection circuit 5 linearly changes with increase of the radio-frequency signal RFIN, causing the current output S53 also to change linearly, and the result of this change is reflected in the RSSI output signal ROUT.

—Zone (iv)—

In zone (iv) in FIG. 7, the radio-frequency signal RFIN changes in the range of −60 [dBm] to −50 [dBm]. At this time, the output of the second-stage first limiting amplifier 512 linearly changes with increase of the radio-frequency signal RFIN, and the result is reflected in the RSSI output signal ROUT. Specifically, the input/output signals of the first-stage and second-stage first limiting amplifiers 511 and 512 rise by 10 [dB] from those described in the above zone. Since the third-stage first limiting amplifier 513 is saturated when the output level is 0 [dBm], the current signal S53 becomes constant. Therefore, the output signal levels of the third-stage to fifth-stage first limiting amplifiers 513 to 515 are substantially unchanged from when the signal level of the radio-frequency signal RFIN was −60 [dBm] (see the broken line extending from between (iii) and (iv) in FIG. 7). Also, since the outputs of the first-stage first limiting amplifier 511 and the second limiting amplifiers 811 and 812 are small, the current signal S51 and the current signals S81 and S82 are also small, so that their influences on the RSSI output signal ROUT are negligible. Therefore, the total of the outputs of the second-stage to fifth-stage first limiting amplifiers 512 to 515 is reflected in the RSSI output signal ROUT. Also, the output of the second-stage first limiting amplifier 512 of the first signal strength detection circuit 5 linearly changes with increase of the radio-frequency signal RFIN, causing the current output S52 also to change linearly, and the result of this change is reflected in the RSSI output signal ROUT.

—Zone (v)—

In zone (v) in FIG. 7, the radio-frequency signal RFIN changes in the range of −50 [dBm] to −40 [dBm]. At this time, the output of the first-stage first limiting amplifier 511 linearly changes with increase of the radio-frequency signal RFIN, and the result is reflected in the RSSI output signal ROUT. Specifically, the input/output signals of the first-stage first limiting amplifier 511 rise by 10 [dB] from those described in the above zone. Since the second-stage first limiting amplifier 512 is saturated when the output level is 0 [dBm], the current signal S52 becomes constant. Therefore, the output signal levels of the second-stage to fifth-stage first limiting amplifiers 512 to 515 are substantially unchanged from when the signal level of the radio-frequency signal RFIN was −50 [dBm] (see the broken line extending from between (iv) and (v) in FIG. 7). Also, since the outputs of the second limiting amplifiers 811 and 812 are small, the current signals S81 and S82 are also small, so that their influences on the RSSI output signal ROUT are negligible. Therefore, the total of the outputs of the first-stage to fifth-stage first limiting amplifiers 511 to 515 is reflected in the RSSI output signal ROUT. Also, the output of the first-stage first limiting amplifier 511 of the first signal strength detection circuit 5 linearly changes with increase of the radio-frequency signal RFIN, causing the current output S51 also to change linearly, and the result of this change is reflected in the RSSI output signal ROUT.

—Zone (vi)—

In zone (vi) in FIG. 7, the radio-frequency signal RFIN changes in the range of −40 [dBm] to −30 [dBm]. As described above, the first filter circuit 4 is saturated when the IF signal S3 becomes −10 [dBm]: i.e., it is saturated when the radio-frequency signal RFIN becomes −40 [dBm]. Therefore, the output signal levels of the first-stage to fifth-stage first limiting amplifiers 511 to 515 are substantially unchanged from when the signal level of the radio-frequency signal RFIN was −40 [dBm].

On the other hand, the signal attenuated by 20 [dB] from the IF signal S3 is input into the second filter circuit 7. Therefore, the second filter circuit 7 is not saturated but outputs the second filter signal S7 having a signal level of −30 [dBm] to −20 [dBm] to the second signal strength detection circuit 8. In the second signal strength detection circuit 8, the first-stage second limiting amplifier 811 receives the second filter signal S7 and outputs a signal having a signal level of −20 [dBm] to −10 [dBm]. The second-stage second limiting amplifier 812 receives the output signal of the first-stage second limiting amplifier 811 and outputs a signal having a signal level of −10 [dBm] to −0 [dBm]. Since the output of the first-stage second limiting amplifier 811 is small, the current signal S81 is also small, so that its influence on the RSSI output signal ROUT is negligible. Therefore, the total of the output of the second-stage second limiting amplifier 812 of the second signal strength detection circuit 8 and the outputs of the first-stage to fifth-stage first limiting amplifiers 511 to 515 of the first signal strength detection circuit 5 is reflected in the RSSI output signal ROUT. Also, the output of the second-stage second limiting amplifier 812 of the second signal strength detection circuit 8 linearly changes with increase of the radio-frequency signal RFIN, causing the current output S82 also to change linearly, and the result of this change is reflected in the RSSI output signal ROUT.

—Zone (vii)—

In zone (vii) in FIG. 7, the radio-frequency signal RFIN changes in the range of −30 [dBm] to −20 [dBm]. As in zone (vi), since the first filter circuit 4 is saturated, the output signal levels of the first-stage to fifth-stage first limiting amplifiers 511 to 515 are substantially unchanged from when the signal level of the radio-frequency signal RFIN was −30 [dBm].

On the other hand, the second filter circuit 7 is not saturated but outputs the second filter signal S7 having a signal level of −20 [dBm] to −10 [dBm] to the second signal strength detection circuit 8. With this, the input/output signals of the first-stage second limiting amplifier 811 rise by 10 [dB]. Since the second-stage second limiting amplifier 812 is saturated when the output level is 0 [dBm], the current signal S82 becomes constant. Therefore, the output signal level of the second-stage second limiting amplifier 812 is substantially unchanged from when the signal level of the radio-frequency signal RFIN was −30 [dBm] (see the broken line extending from between (vi) and (vii) in FIG. 7). Therefore, the total of the outputs of the first-stage and second-stage second limiting amplifiers 811 and 812 of the second signal strength detection circuit 8 and the outputs of the first-stage to fifth-stage first limiting amplifiers 511 to 515 of the first signal strength detection circuit 5 is reflected in the RSSI output signal ROUT. Also, the output of the first-stage second limiting amplifier 811 of the second signal strength detection circuit 8 linearly changes with increase of the radio-frequency signal RFIN, causing the current output S81 also to change linearly, and the result of this change is reflected in the RSSI output signal ROUT.

Comparison with Comparative Example

In FIG. 7, the comparative example indicated by the fine solid line shows a case in which the second limiting amplifier group 80 is not provided in the configuration of FIG. 1 and only the first limiting amplifier group 50 is used to constitute the wireless reception circuit. As shown in zones (i) to (v) in FIG. 7, by adding up the current signals corresponding to the signal amplitudes of the first-stage to fifth-stage first limiting amplifiers 511 to 515, the RSSI output signal ROUT as a pseudo-logarithmic output can be obtained in response to the signal level of the radio-frequency signal RFIN. That is, in the wireless reception circuit of the comparative example, the output signal ROUT changes linearly while the signal level of the radio-frequency signal RFIN changes in the range of −90 [dBm] to −40 [dBm]. When the signal level of the radio-frequency signal RFIN becomes −40 [dBm] to −20 [dBm], however, all of the first limiting amplifiers 511 to 515 are saturated, whereby the RSSI output signal ROUT is also saturated. By contrast, as described above, according to the wireless reception circuit 1 of this embodiment, it is possible to obtain the output changing linearly in response to the radio-frequency signal RFIN having a signal level of −90 [dBm] to −20 [dBm].

Figure 8:
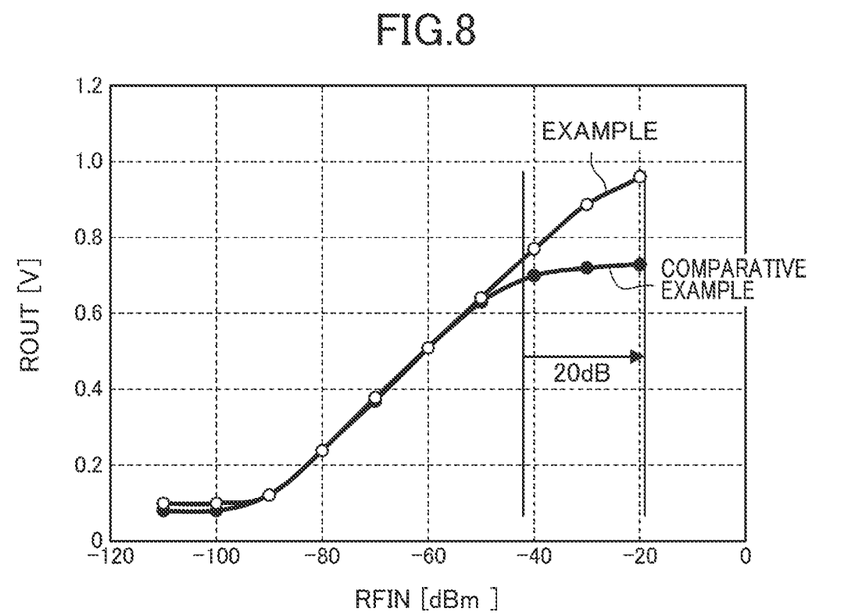
FIG. 8 is a view showing simulation results of the input/output characteristics of the wireless reception circuit.

FIG. 8 shows simulation results of input/output characteristics of the wireless reception circuit 1 of this embodiment (configuration of FIG. 1) and the configuration of the comparative example (where the second limiting amplifier group 80 is not provided). From the results of the simulation, it has been found that, while the output signal ROUT was saturated when the signal level of the radio-frequency signal RFIN was −40 [dBm] in the comparative example, the dynamic range expanded by around 20 [dB] by adopting the configuration of this embodiment, whereby good linear characteristics were confirmed.

In this embodiment, also, the gain amount of the second limiting amplifier group 80 (two second limiting amplifiers 81) and the attenuation amount of the attenuator 6 are the same, i.e., 20 [dB]. This permits signal strength detection with no overlap between the signal strength detection circuits.

<Alteration 1>

Figure 9:
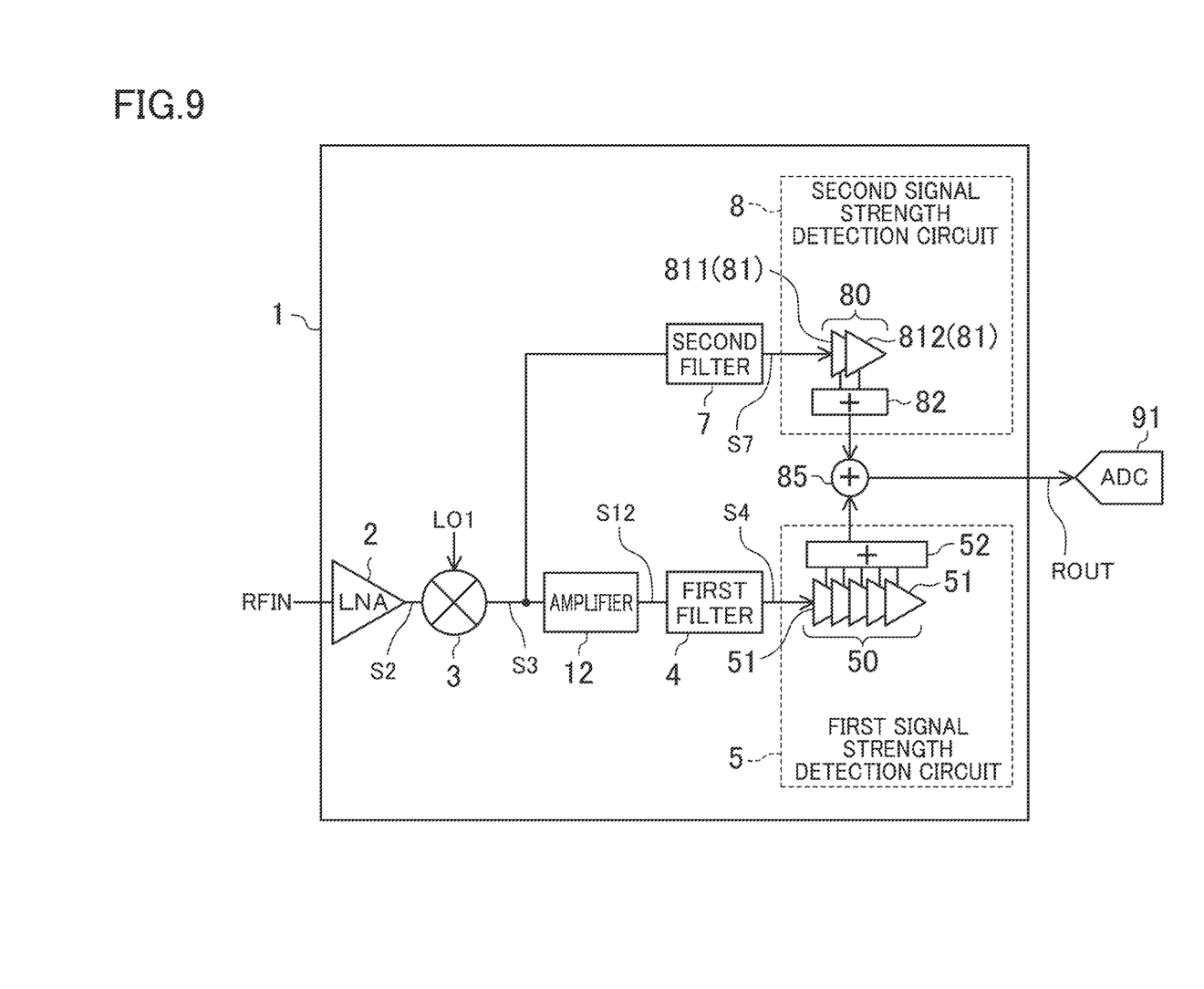
FIG. 9 is a block diagram showing a configuration of a wireless reception circuit of Alteration 1.

FIG. 9 is a block diagram showing a configuration of a wireless reception circuit of Alteration 1. Note that this alteration will be described focusing on different points from FIG. 1, and description of common components may be omitted.

In FIG. 9, an amplifier 12 (corresponding to the amplifier circuit) is provided in place of the attenuator 6 in FIG. 1. Specifically, in FIG. 9, the second filter circuit 7 receives the IF signal S3 output from the mixer 3, filters the IF signal S3, and outputs the resultant signal to the second signal strength detection circuit 8 as the second filter signal S7. The amplifier 12 receives the IF signal S3 output from the mixer 3, amplifies the signal, and outputs the resultant signal as an amplified signal S12. The first filter circuit 4 filters the amplified signal S12 output from the amplifier 12, and outputs the resultant signal to the first signal strength detection circuit 5 as the first filter signal S4. When common characteristics with FIG. 1 are to be imparted, the total of the gains of the LNA 2 and the mixer 3 should be 10 [dB] and the gain of the amplifier 12 should be 20 [dB]. By doing so, an operation similar to that described in [Operation Example of Wireless Reception Circuit] above can be implemented. Specifically, when the radio-frequency signal RFIN changes in the range of −90 [dBm] to −80 [dBm], the signal level of the first filter signal S4 is −60 [dBm] to −50 [dBm]. When the radio-frequency signal RFIN is −40 [dBm], the first filter circuit 4 is saturated, but the second filter circuit 7 is not saturated. When the radio-frequency signal RFIN changes in the range of −40 [dBm] to −30 [dBm], the signal level of the second filter signal S7 is −30 [dBm] to −20 [dBm].

As described above, in Alteration 1, also, an operation similar to that in the above embodiment can be implemented, and similar effects can be obtained. Moreover, with the configuration of FIG. 9, having the amplifier 12, the noise characteristics of the first filter circuit 4 can be improved.

<Alteration 2>

While the above embodiment shows an example of the wireless reception circuit 1 used for a wireless system that demodulates an ASK modulated signal, the application of the technique of the present disclosure is not limited to this. For example, the wireless reception circuit 1 can also be used for a wireless system that demodulates a quadrature phase shift keying (QPSK) modulated signal.

Figure 10:
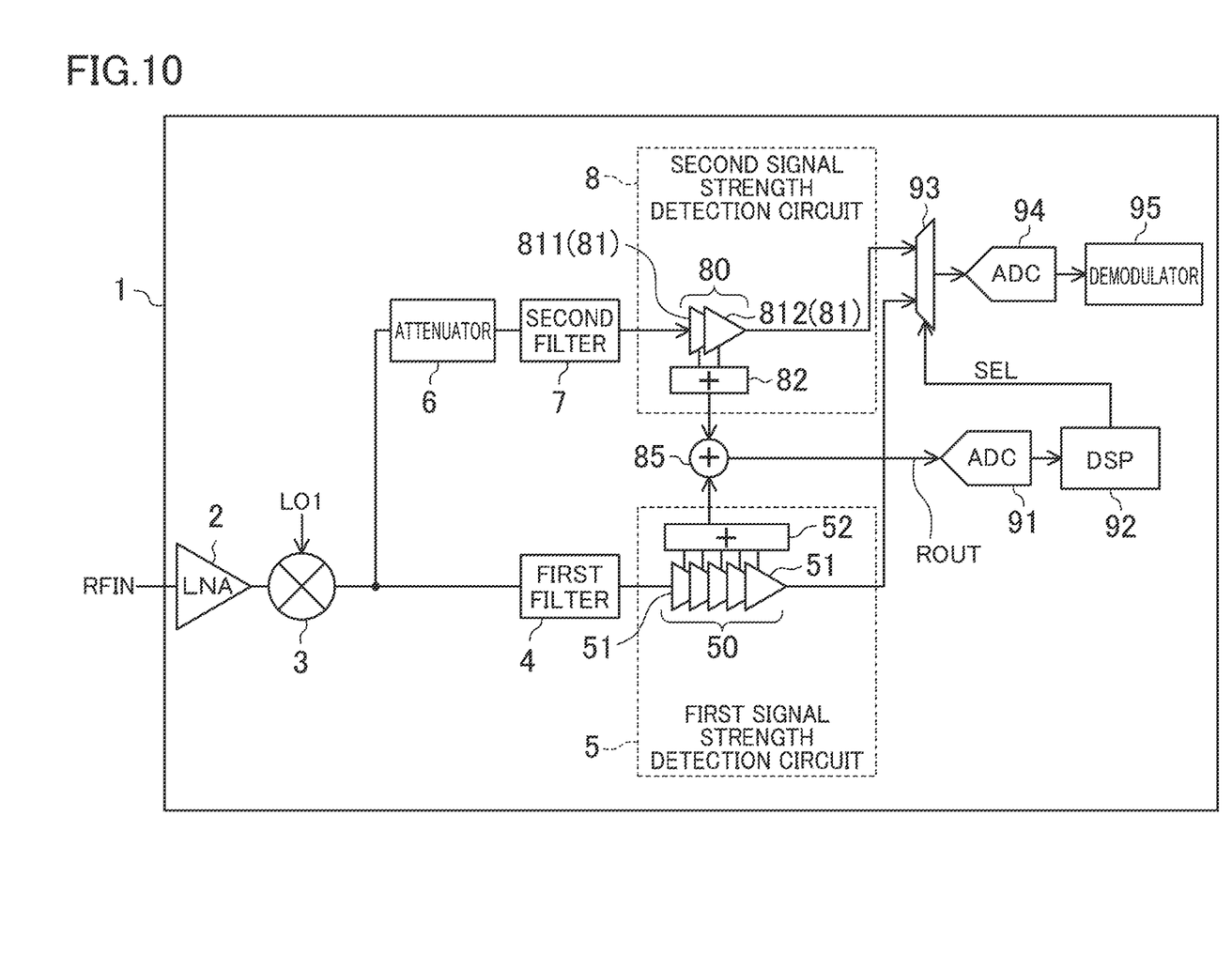
FIG. 10 is a block diagram showing a configuration of a wireless reception circuit of Alteration 2.

FIG. 10 is a block diagram showing a configuration of a wireless reception circuit of Alteration 2. Note that this alteration will be described focusing on different points from FIG. 1, and description of common components may be omitted.

The configuration of FIG. 10 includes a selector 93 and a digital signal processor (DSP) 92 as the control circuit, in addition to the configuration of FIG. 1. The selector 93 receives the output signal (corresponding to an amplified signal) of the fifth-stage (final-stage) first limiting amplifier 515 of the first signal strength detection circuit 5 and the output signal (corresponding to an amplified signal) of the second-stage (final-stage) second limiting amplifier 812 of the second signal strength detection circuit 8, and selects and outputs either one of them. Note that the output signal of the first limiting amplifier 515 is hereinafter referred to as the amplified output signal of the first signal strength detection circuit 5, and the output signal of the second limiting amplifier 812 as the amplified output signal of the second signal strength detection circuit 8.

The DSP 92 receives the RSSI output signal ROUT digitized by the ADC 91, and detects the signal level of the RSSI output signal ROUT. The DSP 92 then controls the selector 93 based on the signal level of the RSSI output signal ROUT so that an unsaturated amplified output signal, out of the amplified output signal of the first signal strength detection circuit 5 and the amplified output signal of the second signal strength detection circuit 8, be output from the selector 93. The output signal of the selector 93 is converted to a digital signal by an ADC 94 and demodulated by a demodulator 95.

In the case of the QPSK modulation scheme, for example, the signal integrity will be deteriorated when the input signal to the demodulator 95 is saturated. It is therefore necessary to adjust the input signal level appropriately. By selecting an unsaturated amplified output signal, out of the amplified output signal of the first signal strength detection circuit 5 and the amplified output signal of the second signal strength detection circuit 8, based on the RSSI output signal ROUT, as in the configuration of FIG. 10, an unsaturated signal with good S/N characteristics can be transmitted to the demodulator 95.

Assuming that the wireless reception circuit 1 has the characteristics of FIG. 7, for example, the amplified output signal of the second signal strength detection circuit 8 will be selected when the signal level of the RSSI output signal ROUT is 0.5 [V], and the amplified output signal of the first signal strength detection circuit 5 will be selected when it is less than 0.5 [V].

Also, in this alteration, while the selector selects one of the output signal of the final-stage first limiting amplifier 515 of the first signal strength detection circuit 5 and the output signal of the final-stage second limiting amplifier 812 of the second signal strength detection circuit 8, the configuration is not limited to this. For example, the configuration may be made so that the output signal of an unsaturated limiting amplifier, among the first limiting amplifier group 50 and the second limiting amplifier group 80, be output from the selector. In this case, by selecting an output signal from an unsaturated appropriate limiting amplifier, among the first limiting amplifiers 51 and the second limiting amplifiers 81, based on the RSSI output signal ROUT, an unsaturated signal with good S/N characteristics can be transmitted to the demodulator. Assuming that the wireless reception circuit 1 has the characteristics of FIG. 7, for example, the output of the second-stage first limiting amplifier 512, out of the first limiting amplifier group 50, may be selected when the signal level of the RSSI output signal ROUT is 0.5 [V].

<Alteration 3>

Figure 11:
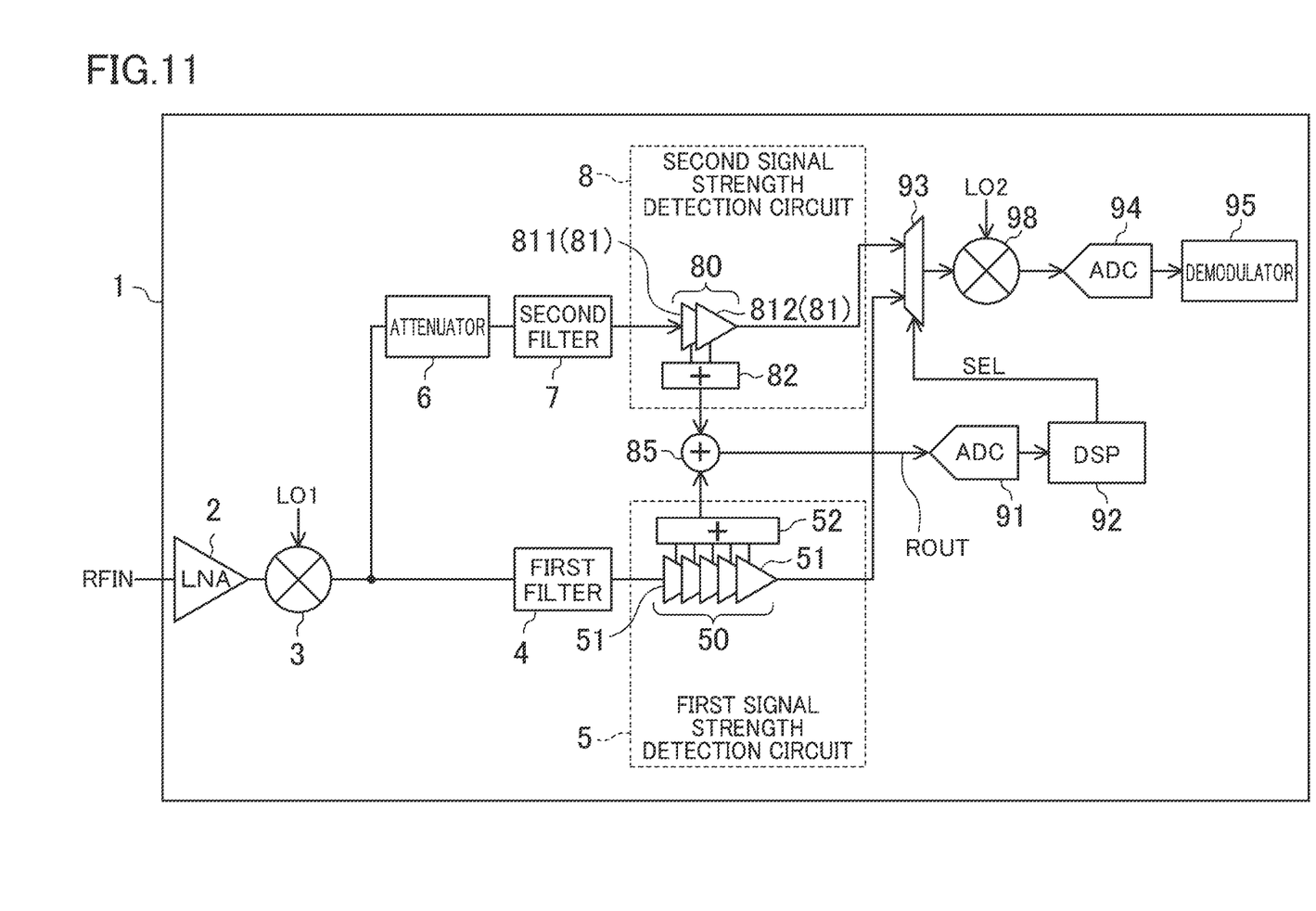
FIG. 11 is a block diagram showing a configuration of a wireless reception circuit of Alteration 3.

FIG. 11 is a block diagram showing a configuration of a wireless reception circuit of Alteration 3. Note that this alteration will be described focusing on different points from FIG. 10, and description of common components may be omitted.

The configuration of FIG. 11 includes a mixer 98 (corresponding to the second mixer) between the selector 93 and the ADC 94, in addition to the configuration of FIG. 10. The mixer 98 receives the output of the selector 93, mixes the received signal with a second local oscillation signal LO2, and outputs the mixed signal. When the second local oscillation signal LO2 is set at around 33 [MHz], for example, the output frequency of the mixer 98 will be around 7 [MHz]. With the configuration of FIG. 11, the frequency of the signal input into the ADC 94 and the demodulator 95 can be reduced, whereby the subsequent signal processing is facilitated.

According to the present disclosure, signal strength can be detected at high speed in a wide dynamic range. The present disclosure is therefore useful as a wireless reception circuit for wireless communication systems such as an ETC system.

What is claimed is:

1. A wireless reception circuit, comprising:
   a low noise amplifier circuit (LNA) that amplifies an input signal;
   a first mixer that receives an output of the low noise amplifier circuit, mixes the received signal with a first local oscillation signal, and outputs the mixed signal;
   a first filter circuit that filters the output of the first mixer;
   a first signal strength detection circuit that receives an output of the first filter circuit and detects signal strength;
   an attenuator that receives the output of the first mixer, attenuates the received signal, and outputs the attenuated signal;
   a second filter circuit that filters the output of the attenuator; and
   a second signal strength detection circuit that receives an output of the second filter circuit and detects signal strength,
wherein
   the signal strength detected by the first signal strength detection circuit and the signal strength detected by the second signal strength detection circuit are added up to obtain signal strength of the input signal.

2. The wireless reception circuit of claim 1, wherein the first signal strength detection circuit includes
a first limiting amplifier group having first limiting amplifiers connected in a cascade arrangement, each outputting an amplitude signal corresponding to the amplitude of an input signal, an initial-stage one of the first limiting amplifiers receiving the output of the first filter circuit, and
a first detection circuit that detects the signal strength by adding up the amplitude signals output from the first limiting amplifiers, and
the second signal strength detection circuit includes
a second limiting amplifier group having second limiting amplifiers connected in a cascade arrangement, each outputting an amplitude signal corresponding to the amplitude of an input signal, an initial-stage one of the second limiting amplifiers receiving the output of the second filter circuit, and
a second detection circuit that detects the signal strength by adding up the amplitude signals output from the second limiting amplifiers.

3. The wireless reception circuit of claim 2, wherein each of the first limiting amplifiers includes
a first amplifier circuit that amplifies an input signal and outputs the result as a first amplified output signal, and
a first converter that converts the amplitude of the first amplified output signal into a current and outputs the current as the amplitude signal, and
each of the second limiting amplifiers includes
a second amplifier circuit that amplifies an input signal and outputs the result as a second amplified output signal, and
a second converter that converts the amplitude of the second amplified output signal into a current and outputs the current as the amplitude signal.

4. The wireless reception circuit of claim 3, further comprising
a selector that selects an unsaturated amplified output signal, out of the first amplified output signal output from the final-stage first limiting amplifier of the first limiting amplifier group and the second amplified output signal output from the final-stage second limiting amplifier of the second limiting amplifier group, based on the signal strength detected by the first signal strength detection circuit and the signal strength detected by the second signal strength detection circuit, and outputs the selected one.

5. The wireless reception circuit of claim 3, further comprising
a selector that selects an amplified output signal output from an unsaturated limiting amplifier, among the first amplified output signals output from the first limiting amplifiers of the first limiting amplifier group and the second amplified output signals output from the second limiting amplifiers of the second limiting amplifier group, based on the signal strength detected by the first signal strength detection circuit and the signal strength detected by the second signal strength detection circuit, and outputs the selected one.

6. The wireless reception circuit of claim 4, further comprising
a second mixer that receives the output of the selector, mixes the received signal with a second local oscillation signal, and outputs the mixed signal.

7. The wireless reception circuit of claim 2, wherein the gain amount of the second limiting amplifier group and the attenuation amount of the attenuator are equal to each other.

8. A wireless reception circuit, comprising:
a low noise amplifier circuit (LNA) that amplifies an input signal;
a first mixer that receives an output of the low noise amplifier circuit, mixes the received signal with a local oscillation signal, and outputs the mixed signal;
an amplifier circuit that receives the output of the first mixer, amplifies the received signal, and outputs the amplified signal;
a first filter circuit that filters the output of the amplifier circuit;
a first signal strength detection circuit that receives an output of the first filter circuit and detects signal strength;
a second filter circuit that filters the output of the first mixer; and
a second signal strength detection circuit that receives an output of the second filter circuit and detects signal strength,
wherein
the signal strength detected by the first signal strength detection circuit and the signal strength detected by the second signal strength detection circuit are added up to obtain signal strength of the input signal.

9. The wireless reception circuit of claim 8, wherein the first signal strength detection circuit includes
a first limiting amplifier group having first limiting amplifiers connected in a cascade arrangement, each outputting an amplitude signal corresponding to the amplitude of an input signal, an initial-stage one of the first limiting amplifiers receiving the output of the first filter circuit, and
a first detection circuit that detects the signal strength by adding up the amplitude signals output from the first limiting amplifiers, and
the second signal strength detection circuit includes
a second limiting amplifier group having second limiting amplifiers connected in a cascade arrangement, each outputting an amplitude signal corresponding to the amplitude of an input signal, an initial-stage one of the second limiting amplifiers receiving the output of the second filter circuit, and
a second detection circuit that detects the signal strength by adding up the amplitude signals output from the second limiting amplifiers.

10. The wireless reception circuit of claim 9, wherein each of the first limiting amplifiers includes
a first amplifier circuit that amplifies an input signal and outputs the result as a first amplified output signal, and
a first converter that converts the amplitude of the first amplified output signal into a current and outputs the current as the amplitude signal, and
each of the second limiting amplifiers includes
a second amplifier circuit that amplifies an input signal and outputs the result as a second amplified output signal, and
a second converter that converts the amplitude of the second amplified output signal into a current and outputs the current as the amplitude signal.

11. The wireless reception circuit of claim 10, further comprising a selector that selects an unsaturated amplified output signal, out of the first amplified output signal output from the final-stage first limiting amplifier of the first limiting amplifier group and the second amplified output signal output from the final-stage second limiting amplifier of the second limiting amplifier group, based on the signal strength detected by the first signal strength detection circuit and the signal strength detected by the second signal strength detection circuit, and outputs the selected one.

12. The wireless reception circuit of claim 10, further comprising
a selector that selects an amplified output signal output from an unsaturated limiting amplifier, among the first amplified output signals output from the first limiting amplifiers of the first limiting amplifier group and the second amplified output signals output from the second limiting amplifiers of the second limiting amplifier group, based on the signal strength detected by the first signal strength detection circuit and the signal strength detected by the second signal strength detection circuit, and outputs the selected one.

13. The wireless reception circuit of claim 11, further comprising
a second mixer that receives the output of the selector, mixes the received signal with a second local oscillation signal, and outputs the mixed signal.

14. The wireless reception circuit of claim 9, wherein
the gain amount of the second limiting amplifier group and the gain amount of the amplifier circuit are equal to each other.

* * * * *